(12) United States Patent
Waltho et al.

(10) Patent No.: US 7,570,702 B2
(45) Date of Patent: Aug. 4, 2009

(54) SIGNAL GENERATION APPARATUS, SYSTEMS, AND METHODS

(75) Inventors: Alan E. Waltho, San Jose, CA (US); Jeffrey Schiffer, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 822 days.

(21) Appl. No.: 10/815,030

(22) Filed: Mar. 30, 2004

(65) Prior Publication Data

US 2005/0220214 A1  Oct. 6, 2005

(51) Int. Cl.
*H04L 27/00* (2006.01)

(52) U.S. Cl. .................. 375/295; 375/298; 375/308

(58) Field of Classification Search ........... 375/295, 375/303, 219, 272, 297, 306, 345, 321, 329
See application file for complete search history.

(56) References Cited

U.S. PATENT DOCUMENTS

| | | | | |
|---|---|---|---|---|
| 5,351,016 A * | 9/1994 | Dent | ...................... | 332/103 |
| 5,701,106 A * | 12/1997 | Pikkarainen et al. | ........ | 332/100 |
| 6,339,621 B1 * | 1/2002 | Cojocaru et al. | ............ | 375/247 |
| 6,507,303 B1 * | 1/2003 | Alelyunas et al. | ........... | 341/144 |
| 6,516,184 B1 * | 2/2003 | Damgaard et al. | ............ | 455/86 |
| 6,671,337 B1 * | 12/2003 | Cordoba | ..................... | 375/345 |
| 6,693,980 B1 * | 2/2004 | Linder et al. | ................. | 375/329 |
| 7,058,037 B1 * | 6/2006 | Moon | ......................... | 370/335 |
| 2001/0024475 A1 * | 9/2001 | Kumar | ...................... | 375/270 |
| 2002/0013131 A1 * | 1/2002 | Doetsch et al. | ............... | 455/71 |
| 2003/0035493 A1 * | 2/2003 | Mollenkopf | ................ | 375/295 |
| 2003/0227896 A1 * | 12/2003 | Mollenkopf et al. | ........ | 370/342 |
| 2004/0032912 A1 * | 2/2004 | Ocenasek et al. | ........... | 375/297 |
| 2005/0118963 A1 * | 6/2005 | Chiu | ....................... | 455/115.1 |
| 2005/0163256 A1 * | 7/2005 | Kroeger | ..................... | 375/300 |
| 2006/0073800 A1 * | 4/2006 | Johnson et al. | .......... | 455/182.3 |

* cited by examiner

*Primary Examiner*—Emmanuel Bayard
(74) *Attorney, Agent, or Firm*—Schwegman, Lundberg & Woessner, P.A.

(57) ABSTRACT

An apparatus and a system, as well as a method and an article, may include shifting a digital baseband signal upward along a frequency spectrum by an amount greater than its bandwidth to provide an elevated frequency digital baseband signal, which in turn may be selected as a single-sideband signal after an image reject mixer is used to further shift the elevated frequency digital baseband signal, and modest filtering techniques are used to reject unwanted sidebands and any carrier that is present.

27 Claims, 4 Drawing Sheets

SIGNAL GENERATION APPARATUS, SYSTEMS, AND METHODS

TECHNICAL FIELD

Various embodiments described herein relate to the field of communications generally, including apparatus, systems, and methods for generating and modulating communications signals.

BACKGROUND INFORMATION

Direct conversion modulation schemes are popular since they can reduce filtering requirements and lend themselves to miniaturization. However, such schemes may not be as attractive for use with spectrally efficient modulation systems (e.g., single sideband (SSB)) that value better control of out-of-band spectral emissions. For example, fixed frequency direct conversion systems for generating SSB signals typically make use of a radio frequency (RF) filter to attenuate unwanted sidebands. These systems may be suitable for narrow band analog voice applications where the passband may be 3 KHz and the lower cutoff frequency is about 300 Hz, but impractical for wideband digital signals where the passband may be 6 MHz and frequency components can exist down to about zero Hertz. The RF filtering required to attenuate the unwanted sideband products may not be readily achievable for this application even at a fixed frequency and may be even more impractical for variable frequency applications.

DETAILED DESCRIPTION

Various embodiments disclosed herein address some of the challenges described above by elevating the frequency of the digital baseband signal, in the digital domain, prior to analog signal conversion. After conversion, the analog signal may then be shifted up in frequency, filtered, and shifted again to the final frequency for tunable systems or direct converted to the final frequency for fixed frequency systems. This technique may permit effective attenuation of unwanted sidebands with simplified circuitry, while at the same time obviating the use of steep skirted filters and/or a well-balanced image reject mixer.

Thus, in some embodiments, an apparatus and a system, as well as a method and an article, may include shifting a digital baseband signal upward along a frequency spectrum by an amount greater than its bandwidth to provide an elevated frequency digital baseband signal, which in turn may be selected as a single-sideband signal after an image reject mixer is used to further shift the elevated frequency digital baseband signal along the frequency spectrum. Modest filtering techniques may be used to reject unwanted sidebands and the carrier since low frequency components may be substantially eliminated within the resulting signal. For example, without the offset provided by shifting the digital baseband signal, a subsequent filter might be needed to provide additional attenuation at near zero frequency separation. Sufficient reduction of unwanted sideband and/or carrier components using the conventional approach may go beyond the capability of the state of the art.

In some embodiments, a digital processor (e.g., a signal processor or a central processing unit) may be used to shift the baseband signal up in frequency by a predetermined amount (e.g., about 12 MHz), before application to the first stage of frequency conversion. An intermediate frequency (IF) filter, such as a surface acoustic wave (SAW) filter, may be used to provide additional attenuation of the LO (local oscillator) and unwanted sideband. If a relatively high IF is utilized, subsequent RF filters may not require tuning. In some embodiments, for example, since the lower sideband and carrier of the mixing process can be moved out-of-band, the upper sideband filtering process becomes relatively easy. The output of the filter may then be frequency shifted (e.g., using another mixer) to a desired output frequency.

Figure 1:
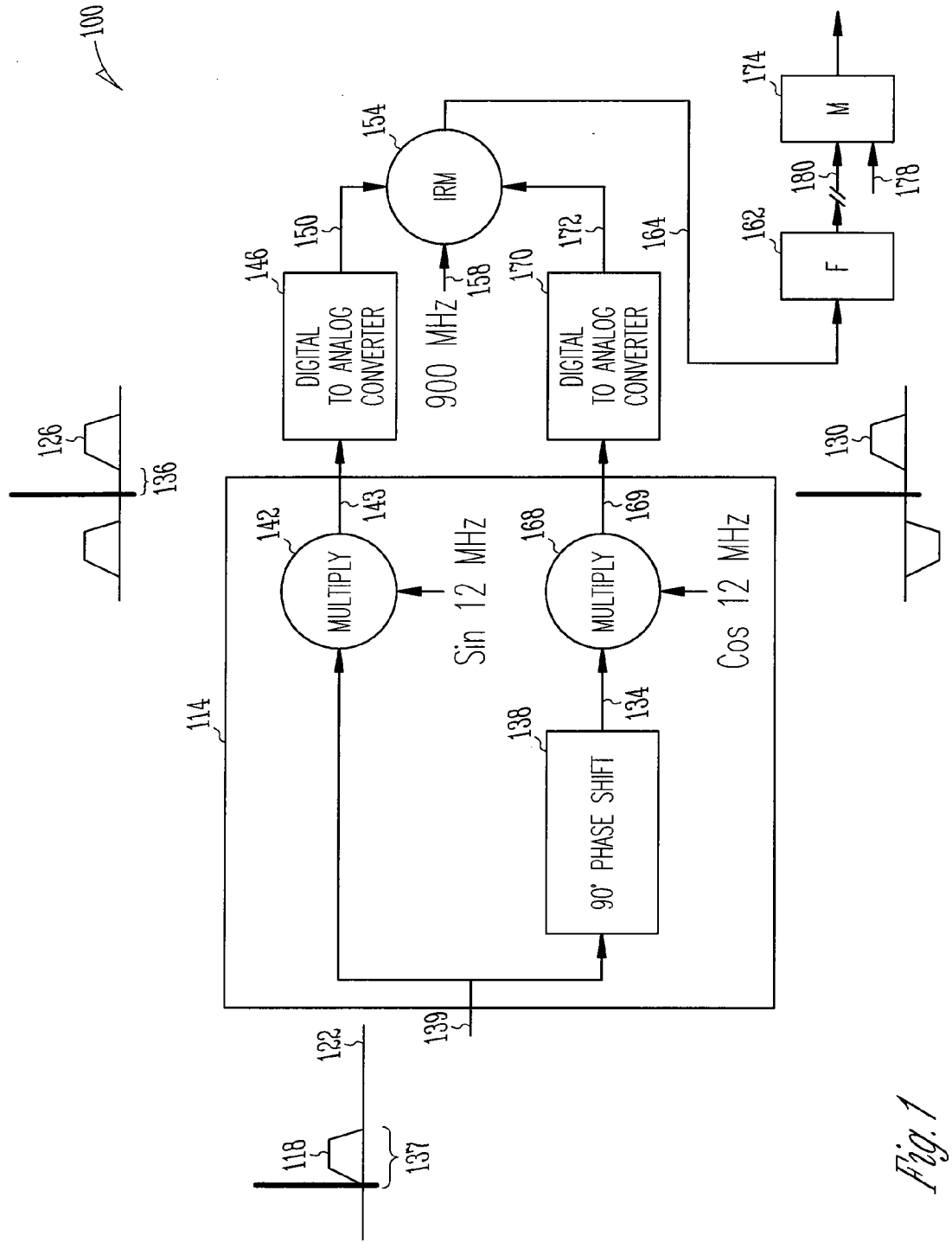
FIG. 1 is a block diagram of a digital modulation apparatus according to various embodiments.

FIG. 1 is a block diagram of a digital modulation apparatus 100 according to various embodiments. In some embodiments of the invention, the apparatus 100 may include a digital processor 114 to shift a digital baseband signal 118 upward along the frequency spectrum 122 by a selected amount to provide a first elevated frequency digital baseband signal 126 and a second elevated frequency digital baseband signal 130 derived from a phase-shifted version 134 of the digital baseband signal 118. The selected amount of frequency shift 136 may be greater than about the bandwidth 137 of the digital baseband signal 118.

For example, in the case of FIG. 1, the bandwidth 137 of the digital baseband signal 118 may extend from about zero Hertz to about six MHz, and the selected amount of frequency shift 136 may be about 12 MHz. The result may be two signals (e.g., the first and second elevated frequency digital baseband signals 126 and 130, respectively), each extending in frequency from about 12 to about 18 MHz, and each being a phase-shifted representation of the other.

In some embodiments, the apparatus 100 may include a phase shifting module 138 to receive the digital baseband signal 118 from a conductor 139 and to provide a phase-shifted version 134 of the digital baseband signal 118. The apparatus 100 may also include a digital mixer 142 to receive the digital baseband signal 118 and to provide the first elevated frequency digital baseband signal 126, perhaps via conductor 143, to a digital to analog converter 146 to provide an analog signal 150.

In some embodiments, the apparatus 100 may include an image reject mixer 154 to receive the analog signal 150 and a carrier signal 158. In the case of FIG. 1, the carrier signal 158 may be about 900 MHz. The apparatus 100 may also include a filter 162 to pass a non-rejected sideband signal 164 provided by the image reject mixer 154. In many embodiments, the non-rejected sideband signal 164 and its image (e.g., the rejected sideband signal not passed by the filter 162) may be separated in frequency by about two times the selected amount of frequency shift (e.g., about 24 MHz when the amount of frequency shift selected for use with the mixers 142, 168 is about 12 MHz).

The apparatus 100 may be suitable for use in many products, including those designed to conform to an Institute of Electrical and Electronics Engineers (IEEE) 802.11 protocol standard. Thus, for example, the digital baseband signal 118 may be formatted according to an IEEE 802.11 standard. For more information on the various IEEE 802.11 standards, please refer to "IEEE Standards for Information Technology—Telecommunications and Information Exchange between Systems—Local and Metropolitan Area Network—

Specific Requirements—Part 11: Wireless LAN Medium Access Control (MAC) and Physical Layer (PHY), ISO/IEC 8802-11: 1999" and related versions.

Many embodiments may be realized. For example, the apparatus 100 may include a first digital mixer 142 to receive a digital baseband signal 118 and to provide a first elevated frequency digital baseband signal 126, as well as a phase shifting module 138 to receive the digital baseband signal 118 and to provide a phase-shifted version 134 of the digital baseband signal 118. The apparatus 100 may also include a second digital mixer 168 to receive the phase-shifted version 134 of the digital baseband signal 118 and to provide a second elevated frequency digital baseband signal 130, perhaps via conductor 169. In some embodiments, the apparatus 100 may include one or more analog to digital converters 146, 170 to receive a selected one of the first elevated frequency digital baseband signal 126 and the second elevated frequency digital baseband signal 130 and provide analog signals 150, 172 to an image reject mixer 154, which in turn may provide an upper or lower sideband with a vestigial pilot carrier (e.g., the non-rejected sideband signal (164)).

In some embodiments, the apparatus 100 may include a filter 162, such as a surface acoustic wave filter, to pass a wanted sideband signal 164 provided by the image reject mixer 154. The apparatus 100 may also include another mixer 174 which combines a signal generated by the synthesizer 178 and the filtered desired sideband signal 180 derived from the wanted sideband signal 164 provided by the image reject mixer 154. The synthesized carrier signal 178 may include an output, in some embodiments, from about 1100 MHz to about a 1400 MHz with about a six MHz step capability.

Figure 2:
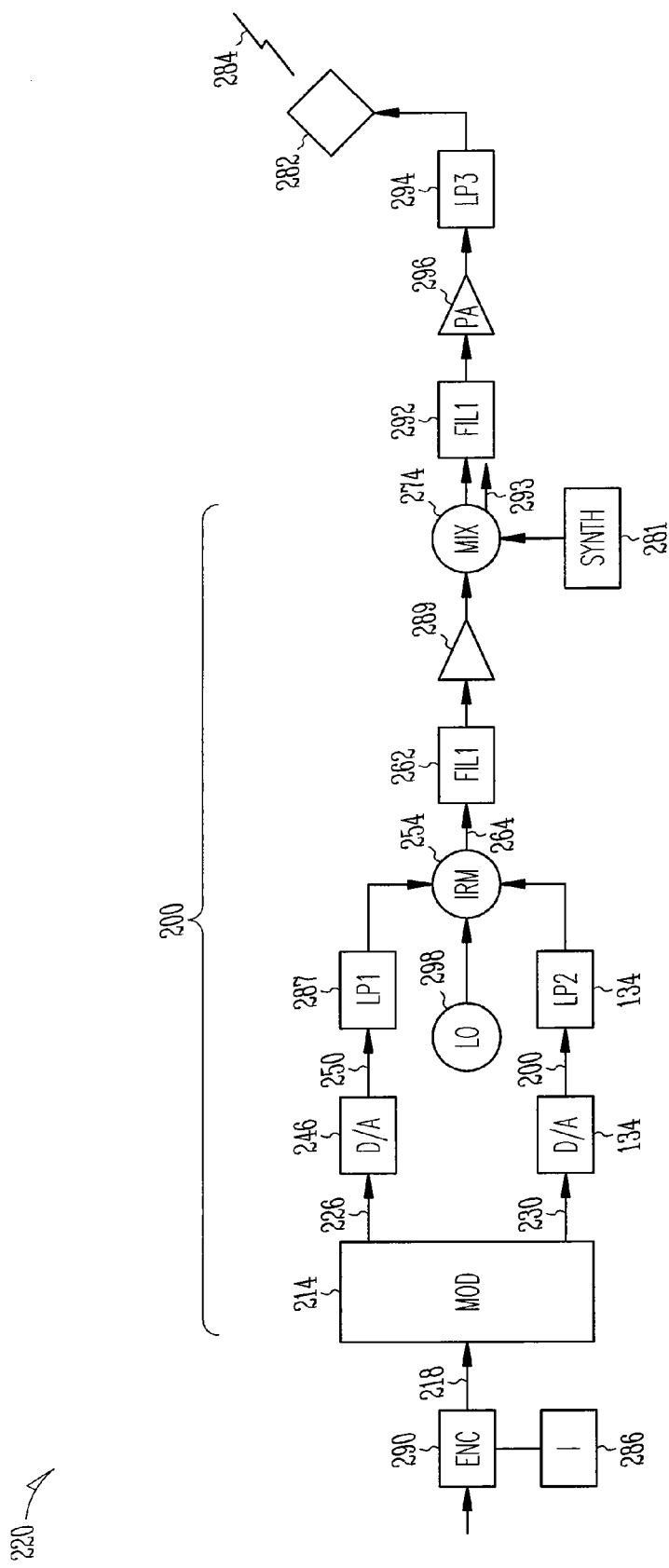
FIG. 2 is a block diagram of an apparatus and a system according to various embodiments.

FIG. 2 is a block diagram of an apparatus 200 and a system 220 according to various embodiments, each of which may operate in the manner described. The apparatus 200 may be similar to or identical to the apparatus 100 (see FIG. 1). Thus, in some embodiments of the invention, a system 220 may include one or more of the apparatus 200 described previously. Similarly, the system 220 may include one or more filters 262 (similar to or identical to the filter 162 of FIG. 1) to receive a non-rejected sideband signal 264, and one or more mixers 274 (similar to or identical to the mixer 174 of FIG. 1).

For example, in some embodiments, the system 220 may include a digital processor 214, similar to or identical to the digital processor 114 in FIG. 1, having a digital mixer (see FIG. 1, elements 142, 168) to receive a selected one of the digital baseband signal 218 and a phase-shifted version of the digital baseband signal (see FIG. 1, element 134) so as to provide the first elevated frequency digital baseband signal 226 and the second elevated frequency digital baseband signal 230, respectively. The system 220 (and the apparatus 200) may also include one or more filters 287, 288 to pass an analog signal 250, 272 provided by one or more digital to analog converters 246, 270 to receive a selected one of the first elevated frequency digital baseband signal 226 and the second elevated frequency digital baseband signal 230. The filters 287, 288 may comprise 20 MHz low-pass filters in some embodiments. The digital to analog converters may comprise 10-bit, 40 megasample analog to digital converters in some embodiments.

Thus, in some embodiments, two digitally modulated signals may be shifted to occupy a channel, such as a 5.5 MHz channel centered at 15 MHz. The digitally modulated signals may then be converted to analog signals that have harmonic products (perhaps created during the analog conversion process) removed using filters, such as 20 MHz low-pass filters. The result may be up-converted in an image reject mixer 254 to about 915 MHz. The mixing process may provide a lower sideband image at 885 MHz that can be filtered, or rejected easily.

In some embodiments, the system 220 may include one or more buffers 289 to couple the filter 262 and the mixer 274. The mixer 274, in turn, may have a synthesizer 281 (e.g., the mixer 274 may be coupled to the synthesizer 281) as one of it's inputs.

In some embodiments, the system 220 may include an antenna 282 to transmit a communications signal 284 derived from the first elevated frequency digital baseband signal 226. The antenna 282 may include any number and type of antennas, including patch, omnidirectional, beam, monopole, dipole, and rhombic antennas, among others. The antenna 282 may be included in a multiple-input, multiple-output (MIMO) communications system. In some embodiments, the system 220 may include a display 286 to display information I associated with the digital baseband signal 218. In some embodiments, the system 220 may include one or more channel encoders 290 to encode the information I and provide the digital baseband signal 218. The input to the channel encoder may be data formatted according to a desired protocol, such as an IEEE 802.11 standard. Some embodiments may include additional high-pass filters 292 (e.g., a 450 MHz high-pass filter), low-pass filters 294 (e.g., a 700 MHz low-pass filter), and amplifiers 296 (e.g., a power amplifier), as desired.

Thus, in some embodiments, an analog mixer 254 may be driven by a 900 MHz local oscillator 298 to shift a vestigial sideband (VSB) signal up to the range of a subsequent filter, such as a SAW filter. Another mixer 274 may then shift the resulting shifted VSB signal to the desired output frequency range, using a 450 MHz band-pass filter 292 to clean up the output spectrum. Other frequencies can be used as desired. In some embodiments, the output signal 293 of the final mixer may be the output signal of the system 220. For example, a 915 MHz signal provided by the image reject mixer 254 combined with a local oscillator 298 of about 200 to 500 MHz may provide a difference frequency as an output signal of about 415 to 715 MHz.

The communications signal 284 and/or the output signal 293 may be formatted according to many communications standards, such as various television broadcast standards, including without limitation, an Advanced Television Systems Committee (ATSC) standard, and an International Telecommunication Union (ITU) standard, as well as related standards. For more information on ATSC standards, please see *ATSC Standard A/*53 (1995): ATSC Digital Television Standard, Advanced Television Systems Committee, Washington, D.C., 1994. For more information on ITU standards, please see *Recommendation ITU-R BT.*601-4 (1994): Encoding Parameters of Digital Television for Studios.

The apparatus 100, 200, digital processors 114, 214, digital baseband signals 118, 218, frequency spectrum 122, elevated frequency digital baseband signals 126, 130, 226, 230, phase-shifted version 134, phase shifting module 138, digital mixers 142, 168, analog converters 146, 170, 246, 270, analog signals 150, 172, 250, 264, 272, image reject mixers 154, 254, carrier signal 158, filters 162, 262, 287, 288, non-rejected sideband signal 164, 264, mixers 174, 274, synthesized carrier signal 178, filtered sideband signal 180, synthesizer 281, antenna 282, communications signal 284, display 286, buffer 289, channel encoder 290, high-pass filter 292, output 293, low-pass filter 294, amplifier 296, and local oscillator 298 may all be characterized as "modules" herein. Such modules may include hardware circuitry, and/or a processor and/or memory circuits, software program modules and objects, and/or firmware, and combinations thereof, as desired by the architect of the apparatus 100, 200, and systems 220, and as appropriate for particular implementations of various embodiments. For example, such modules may be included in a system operation simulation package, such as a software electrical signal simulation package, a power usage and distribution simulation package, a capacitance-inductance simulation package, a power/heat dissipation simulation package, a MIMO signal transmission-reception simulation package, and/or a combination of software and hardware used to simulate the operation of various potential embodiments.

It should also be understood that the apparatus and systems of various embodiments can be used in applications other than for transmitters and transceivers, and thus, various embodiments are not to be so limited. The illustrations of apparatus 100, 200 and systems 220 are intended to provide a general understanding of the structure of various embodiments, and they are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, processor modules, embedded processors, data switches, and application-specific modules, including multilayer, multi-chip modules. Such apparatus and systems may further be included as sub-components within a variety of electronic systems, such as televisions, cellular telephones, personal computers, workstations, radios, video players, vehicles, and others. Some embodiments include a number of methods.

Figure 3:
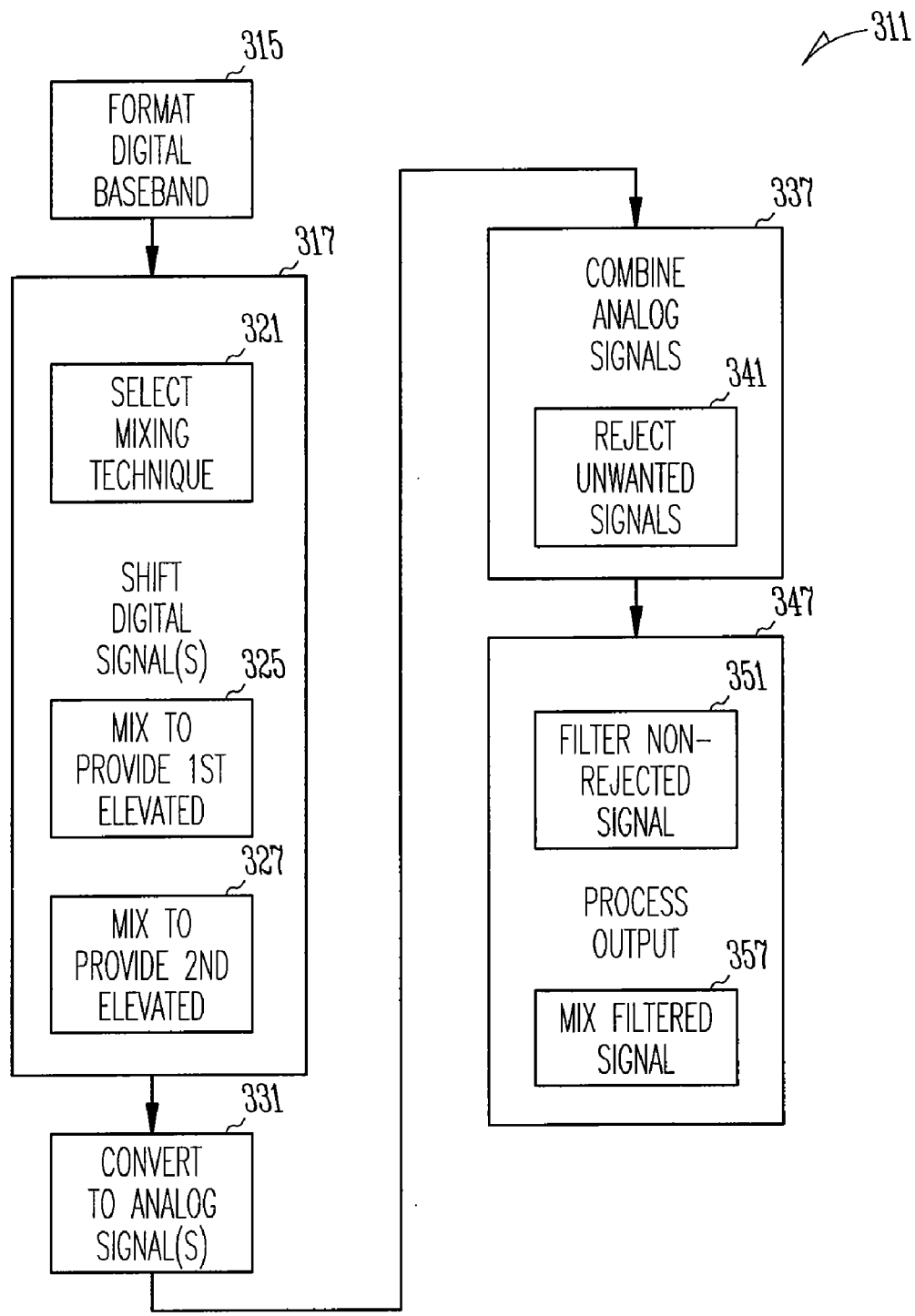
FIG. 3 is a flow chart illustrating several methods according to various embodiments.

For example, FIG. 3 is a flow chart illustrating several methods 311 according to various embodiments. For example, a method 311 may (optionally) begin at block 315 with formatting a digital baseband signal according to some recognized industry standard, for example an IEEE 802.11 system. The method 311 may then include shifting the digital baseband signal upward along a frequency spectrum by a selected amount to provide a first elevated frequency digital baseband signal and a second elevated frequency digital baseband signal (derived from a phase-shifted version of the digital baseband signal) at block 317.

In some embodiments of the invention, the method 311 may include selecting a mixing technique from a Weaver technique and a Norgaard technique, perhaps including the use of one or more Hilbert transforms, as known to those of ordinary skill in the art at block at block 321. For more information regarding Weaver mixing techniques, please refer to *The Design of CMOS Radio-Frequency Integrated Circuits*, by Thomas H. Lee, Cambridge University Press, 1998. For more information about Norgaard techniques, please see Norgaard, D. E.: The Phase-Shift Method of Single-Sideband Signal Generation, *Proc. Institute of Radio Engineers* (*IRE*) December, 1956.

The method 311 may then include mixing the digital baseband signal with a digital carrier frequency to provide the first elevated frequency digital baseband signal at block 325, and mixing the phase-shifted version of the digital baseband signal with a digital carrier frequency to provide the second elevated frequency digital baseband signal at block 327.

In some embodiments, the method 311 may include converting each, or a selected one, of the first elevated frequency digital baseband signal and the second elevated frequency digital baseband to a first analog signal and a second analog signal, respectively, at block 331. For example, the first analog signal may comprise a first analog sideband signal, and the second analog signal may comprise a second analog sideband signal. The method 311 may include combining the first analog signal, which may comprise an analog sideband signal, and the second analog signal, which may comprise an analog sideband signal, to provide a non-rejected sideband signal modulated by an analog carrier frequency at block 337. Thus, the method 311 may include mixing the first analog signal and the second analog signal with a carrier frequency to provide an output signal (e.g., a non-rejected SSB signal). The method 311 may also include rejecting a resulting lower (or upper) sideband signal from the output signal at block 341.

In some embodiments, the method 311 may include processing the output signal to provide a communications signal, such as a VSB television signal, at block 347. The method 311 may include filtering the non-rejected sideband signal of block 337 to provide a filtered sideband signal at block 351, and combining (e.g., mixing) the filtered sideband signal with a synthesized carrier signal to provide the communications signal at block 357.

It should be noted that the methods described herein do not have to be executed in the order described, or in any particular order. Moreover, various activities described with respect to the methods identified herein can be executed in serial or parallel fashion. Information, including parameters, commands, operands, and other data, can be sent and received in the form of one or more carrier waves.

Upon reading and comprehending the content of this disclosure, one of ordinary skill in the art will understand the manner in which a software program can be launched from a computer-readable medium in a computer-based system to execute the functions defined in the software program. One of ordinary skill in the art will further understand the various programming languages that may be employed to create one or more software programs designed to implement and perform the methods disclosed herein. The programs may be structured in an object-orientated format using an object-oriented language such as Java or C++. Alternatively, the programs can be structured in a procedure-orientated format using a procedural language, such as assembly or C. The software components may communicate using any of a number of mechanisms well known to those skilled in the art, such as application program interfaces or interprocess communication techniques, including remote procedure calls. The teachings of various embodiments are not limited to any particular programming language or environment. Thus, other embodiments may be realized.

Figure 4:
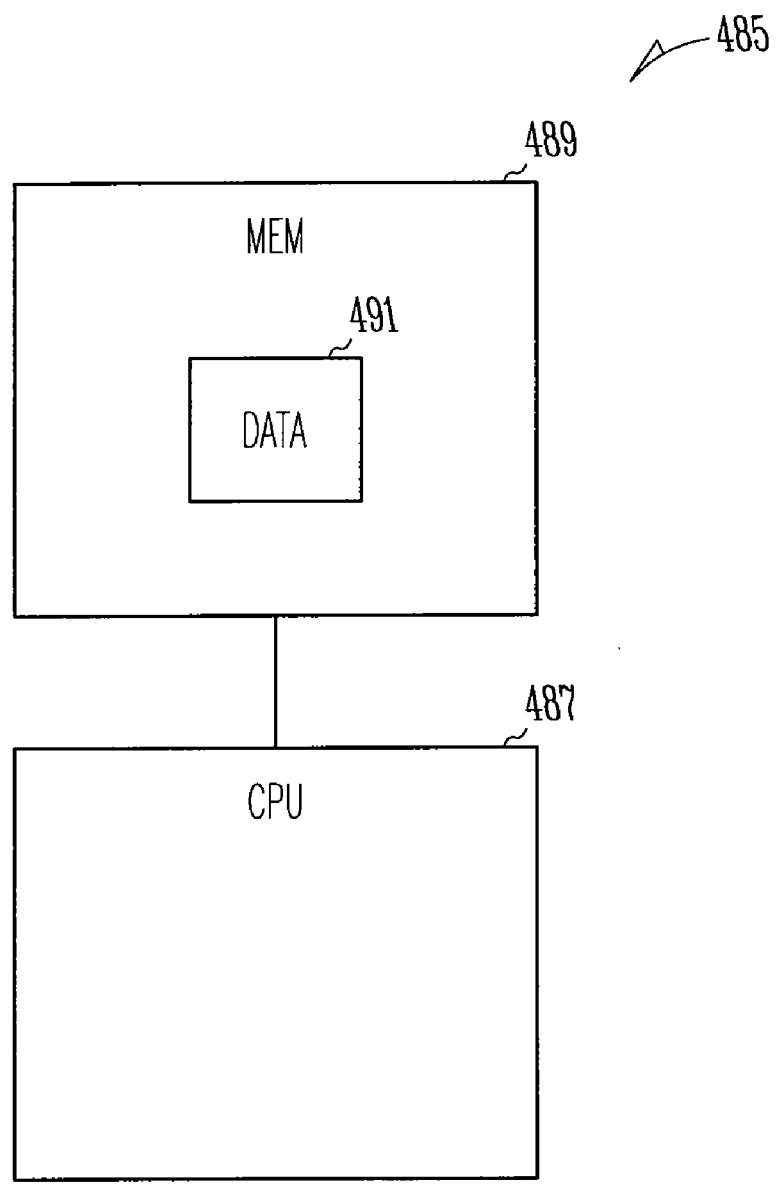
FIG. 4 is a block diagram of an article according to various embodiments.

FIG. 4 is a block diagram of an article 485 according to various embodiments, such as a computer, a memory system, a magnetic or optical disk, some other storage device, and/or any type of electronic device or system. The article 485 may include a processor 487 coupled to a machine-accessible medium such as a memory 489 (e.g., a memory including an electrical, optical, or electromagnetic conductor) having associated information 491 (e.g., computer program instructions and/or data), which, when accessed, results in a machine (e.g., the processor 487) performing such actions as shifting a digital baseband signal upward along a frequency spectrum by a selected amount to provide a first elevated frequency digital baseband signal and a second elevated frequency digital baseband signal (derived from a phase-shifted version of the digital baseband signal).

In some embodiments, the information, when accessed, may result in the machine performing such activities as converting the first elevated frequency digital baseband signal into a first analog sideband signal, and converting the second elevated frequency digital baseband signal into a second analog sideband signal. Other activities may include combining the first analog sideband signal and the second analog sideband signal to provide a non-rejected sideband signal modulated by an analog carrier frequency, as well as filtering the non-rejected sideband signal to provide a filtered sideband signal, and combining (e.g., mixing) the filtered sideband signal with a synthesized carrier signal to provide a communications signal.

Although the inventive concept may be discussed in the exemplary context of an 802.11x implementation (e.g., 802.11a, 802.11g, 802.11 HT, etc.), the claims are not so limited. Indeed, embodiments of the present invention may well be implemented as part of any wireless system, including those using multi-carrier wireless communication channels (e.g., orthogonal frequency-division multiplexing (OFDM), discrete multi-tone modulation (DMT), etc.), such as may be used within, without limitation, a wireless personal area network (WPAN), a wireless local area network (WLAN), a wireless metropolitan are network (WMAN), a wireless wide area network (WWAN), a cellular network, a third generation (3G) network, a fourth generation (4G) network, a universal mobile telephone system (UMTS), and the like communication systems.

Implementing the apparatus, systems, and methods disclosed herein may improve unwanted sideband rejection performance using less complex circuitry. Stringent filter requirements may thus be relaxed, and the circuit real estate required by sideband communication systems may be reduced.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An apparatus, including:
    a digital processor to shift a digital baseband signal upward along a frequency spectrum by a selected amount of frequency shift to provide a first elevated frequency digital baseband signal and a second elevated frequency digital baseband signal derived from a phase-shifted version of the digital baseband signal; and
    a digital mixer to receive the digital baseband signal and to provide the first elevated frequency digital baseband signal,
    wherein the selected amount of frequency shift is greater than about a bandwidth of the digital baseband signal.

2. The apparatus of claim 1, further including:
    a phase shifting module to receive the digital baseband signal and to provide the phase-shifted version of the digital baseband signal.

3. The apparatus of claim 1, further including:
    a digital to analog converter to receive the first elevated frequency digital baseband signal and to provide an analog signal.

4. The apparatus of claim 3, further including:
    an image reject mixer to receive the analog signal and a carrier signal.

5. The apparatus of claim 4, further including:
    a filter to pass a non-rejected sideband signal provided by the image reject mixer.

6. The apparatus of claim 1, wherein the digital baseband signal is formatted according to an Institute of Electrical and Electronics Engineers 802.11 standard.

7. An apparatus, including:
    a first digital mixer to receive a digital baseband signal and to shift the digital baseband signal upward along a frequency spectrum by a selected amount of frequency shift, to provide a first elevated frequency digital baseband signal;
    a phase shifting module to receive the digital baseband signal and to provide a phase-shifted version of the digital baseband signal;
    a second digital mixer to receive the phase-shifted version of the digital baseband signal and to shift the phase-shifted version of the digital baseband signal upward along the frequency spectrum by the selected amount of frequency shift, to provide a second elevated frequency digital baseband signal; and
    a digital to analog converter to receive a selected one of the first elevated frequency digital baseband signal and the second elevated frequency digital baseband signal and to provide an analog signal to an image reject mixer,
    wherein the selected amount of frequency shift is greater than about a bandwidth of the digital baseband signal.

8. The apparatus of claim 7, further including:
    a surface acoustic wave filter to pass a non-rejected sideband signal provided by the image reject mixer.

9. The apparatus of claim 7, further including:
    an analog mixer to combine a synthesized carrier signal and a filtered sideband signal derived from a non-rejected sideband signal provided by the image reject mixer.

10. A system, including:
    a digital processor to shift a digital baseband signal upward along a frequency spectrum by a selected amount of frequency shift to provide a first elevated frequency digital baseband signal and a second elevated frequency digital baseband signal derived from a phase-shifted version of the digital baseband signal; and an omnidirectional antenna to transmit a communications signal derived from the first elevated frequency digital baseband signal, wherein the selected amount of frequency shift is greater than about a bandwidth of the digital baseband signal.

11. The system of claim 10, further including:
a display to display information associated with the digital baseband signal.

12. The system of claim 10, further including:
a digital mixer to receive a selected one of the digital baseband signal and the phase-shifted version of the digital baseband signal and to provide the first elevated frequency digital baseband signal and the second elevated frequency digital baseband signal, respectively.

13. The system of claim 10, further including:
a filter to pass an analog signal provided by a digital to analog converter to receive a selected one of the first elevated frequency digital baseband signal and the second elevated frequency digital baseband signal.

14. The system of claim 10, wherein the onmidirectional antenna is included in a multiple-input, multiple-output communications system.

15. The system of claim 10, wherein the communications signal is formatted according to an Advanced Television Systems Committee (ATSC) standard.

16. A method, including:
shifting a digital baseband signal upward along a frequency spectrum by a selected amount of frequency shift to provide by a first digital mixer a first elevated frequency digital baseband signal and by a second digital mixer a second elevated frequency digital baseband signal derived from a phase-shifted version of the digital baseband signal, wherein the selected amount of frequency shift is greater than about a bandwidth of the digital baseband signal, and wherein the phase-shifted version of the digital baseband signal is provided by a phase shifting module to shift the digital baseband signal.

17. The method of claim 16, further including:
mixing the digital baseband signal with a digital carrier frequency to provide the first elevated frequency digital baseband signal.

18. The method of claim 17, further including:
selecting a mixing technique from a Weaver technique and a Norgaard technique.

19. The method of claim 16, further including:
mixing the phase-shifted version of the digital baseband signal with a digital carrier frequency to provide the second elevated frequency digital baseband signal.

20. The method of claim 16, further including:
converting a selected one of the first elevated frequency digital baseband signal and the second elevated frequency digital baseband to a first analog signal and a second analog signal, respectively.

21. The method of claim 20, further including:
mixing the first analog signal and the second analog signal with a carrier frequency to provide an output signal; and
rejecting a resulting lower sideband signal from the output signal.

22. The method of claim 21, further including:
processing the output signal to provide a vestigial sideband television signal.

23. The method of claim 16, further including:
formatting the digital baseband signal according to an Institute of Electrical and Electronics Engineers 802.11 standard.

24. An article comprising a machine-accessible medium having associated information, wherein the information, when accessed, results in a machine performing:
shifting a digital baseband signal upward along a frequency spectrum by a selected amount of frequency shift to provide a first elevated frequency digital baseband signal and a second elevated frequency digital baseband signal derived from a phase-shifted version of the digital baseband signal, wherein the selected amount of frequency shift is greater than about a bandwidth of the digital baseband signal.

25. The article of claim 24, wherein the information, when accessed, results in the machine performing:
converting the first elevated frequency digital baseband signal into a first analog sideband signal; and
converting the second elevated frequency digital baseband signal into a second analog sideband signal.

26. The article of claim 25, wherein the information, when accessed, results in the machine performing:
combining the first analog sideband signal and the second analog sideband signal to provide a non-rejected sideband signal modulated by an analog carrier frequency.

27. The article of claim 26, wherein the information, when accessed, results in the machine performing:
filtering the non-rejected sideband signal to provide a filtered sideband signal; and
combining the filtered sideband signal with a synthesized carrier signal to provide a communications signal.

* * * * *

UNITED STATES PATENT AND TRADEMARK OFFICE
CERTIFICATE OF CORRECTION

PATENT NO. : 7,570,702 B2  Page 1 of 1
APPLICATION NO. : 10/815030
DATED : August 4, 2009
INVENTOR(S) : Waltho et al.

It is certified that error appears in the above-identified patent and that said Letters Patent is hereby corrected as shown below:

In column 9, line 24, in Claim 14, delete "onmidirectional" and insert -- omnidirectional --, therefor.

In column 10, line 8, in Claim 20, after "baseband" insert -- signal --.

Signed and Sealed this

Twelfth Day of January, 2010

David J. Kappos
*Director of the United States Patent and Trademark Office*